United States Patent [19]

Lewis

[11] Patent Number: 5,412,391
[45] Date of Patent: May 2, 1995

[54] ADAPTIVE DECORRELATING SIDELOBE CANCELLER

[75] Inventor: Bernard L. Lewis, Oxon Hill, Md.

[73] Assignee: The United States of America as represented by the Secretary of the Navy, Washington, D.C.

[21] Appl. No.: 841,491

[22] Filed: Oct. 6, 1977

[51] Int. Cl.[6] ........................... G01S 3/16; G01S 3/28
[52] U.S. Cl. ..................................................... 342/379
[58] Field of Search ................. 342/100 LE, 100 CL, 342/379; 325/371

[56] References Cited

U.S. PATENT DOCUMENTS 4,005,426  1/1977  White ........................... 343/100 LE

*Primary Examiner*—Theodore M. Blum
*Attorney, Agent, or Firm*—Thomas E. McDonnell

[57] ABSTRACT

A canceller system having four or more signal sources with correlated components uses signals from three of the signal sources to cancel correlated components from the signal of the fourth signal source. The canceller apparatus includes a main cancellation channel with serial cancellers and a preprocessing arrangement of cancellers made up of M auxiliary channels each having M−1 serial cancellers. Each of the M auxiliary channels outputs is decorrelated from each other auxiliary channel output and each is provided as an input to one of the main channel serial canceller.

6 Claims, 1 Drawing Sheet

ADAPTIVE DECORRELATING SIDELOBE CANCELLER

BACKGROUND OF THE INVENTION

FIELD OF THE INVENTION

The invention relates to sidelobe canceller systems, MTI systems and other systems that decorrelate signals by removing correlated components. More specifically, the invention relates to a preprocessing arrangement of cancellers for cancellation of correlated signals.

Generally, a signal-processing system is designed to reduce the presence of undesired signals received together with desired signals. An example of this type of system is a sidelobe canceller system. In a conventional sidelobe canceller system, the main-radar antenna receives desirable target reflections through a high-gain main lobe and undesirable interference or jamming signals from M sources through low-gain sidelobes. These signals are all mixed in the antenna output.

Omnidirectional auxiliary antennas receive interference components which are correlated with the interference components of the main radar antenna signal. A sidelobe canceller system uses the auxiliary antenna signals to cancel the correlated components from the main radar antenna signal. At least M auxiliary antennas must be used to cancel M interference components.

Similarily, in MTI systems the received radar-return pulses include desired target reflections and undesired clutter from the sea surface, slow-moving rain squalls, chaff, etc. The radar clutter is correlated from pulse to pulse while the target reflections are moving quickly and have a phase change from pulse to to pulse, thus being uncorrelated. The MTI system cancels all correlated signals on a pulse-to-pulse basis, thus cancelling clutter, and passes uncorrelated signals, thus passing target reflections. The MTI system must use M +1 pulses to cancel M sources of clutter.

In the past, it was known how to build a canceller system having two auxiliary channels which would optimally cancel all correlated signal components between a main signal and two auxiliary signals. However, it was not known how to build a system having three or more auxiliary channels which would cancel all correlated components between the main channel and all auxiliary channels. For example, in a three auxiliary channel system, it was known how to decorrelate all components between the main channel and the first and second channels. However, in attempting to decorrelate the main channel from the third auxiliary channel it was not known how to remove both the first and second channel correlated components from the third channel. When removing either the first or second channel correlated components from the third channel the correlated components from the other of the two channels was reintroduced. Several configurations of canceller schemes were tried including those in U.S. Pat. No. 3,938,153 and 3,938,154.

What is needed is a canceller system which will provide optimum cancellation with the minimum number of cancellers when three or more auxiliary channels are used.

SUMMARY OF THE INVENTION

The present invention is directed to a preprocessing arrangement of cancellers for a canceller system having three or more auxiliary channels. Optimum cancellation is achieved with the minimum number of cancellers.

The canceller system includes multiple signal sources all having correlated components. The correlated components are cancelled from one source by using the signals from the other sources in the cancellation process.

The apparatus of the canceller system includes a conventional main channel having serially connected cancellers the first of which receives a signal from one of the multiple sources.

The canceller system further includes a preprocessing arrangement of cancellers made up of auxiliary channels. In the preprocessing arrangement the first auxiliary channel (M =1) has no canceller and is one of the signal sources. It is the first auxiliary channel output which is fed to one of the cancellers of the main channel. Each remaining auxiliary channel (M >1) has M−1 serially connected cancellers. The first serial canceller for each auxiliary channel receives the output of one of the input signals. Each of the remaining serial cancellers receives the output of the preceeding canceller at its main terminal, the last serial canceller for each auxiliary channel provides the auxiliary channel output. Each of the serial cancellers for each auxiliary channel receives at its auxiliary terminal the auxiliary channel output from a different one of the preceeding auxiliary channels. Each of the auxiliary channel outputs is additionally provided to the auxiliary terminal of a different one of the main-channel cancellers.

An example of the above type canceller system is a sidelobe canceller system. The main signal source is a main radar antenna and the auxiliary signal sources are auxiliary antennas. Another example of a canceller system is an MTI system. In an MTI system using N pulses, the main signal source may be any of the N pulses and the auxiliary signal sources may be the remainder of the pulses.

The novel aspect of the canceller system is the preprocessing arrangement of cancellers.

DESCRIPTION OF THE PREFERRED EMBODIMENTS

Figure 1:
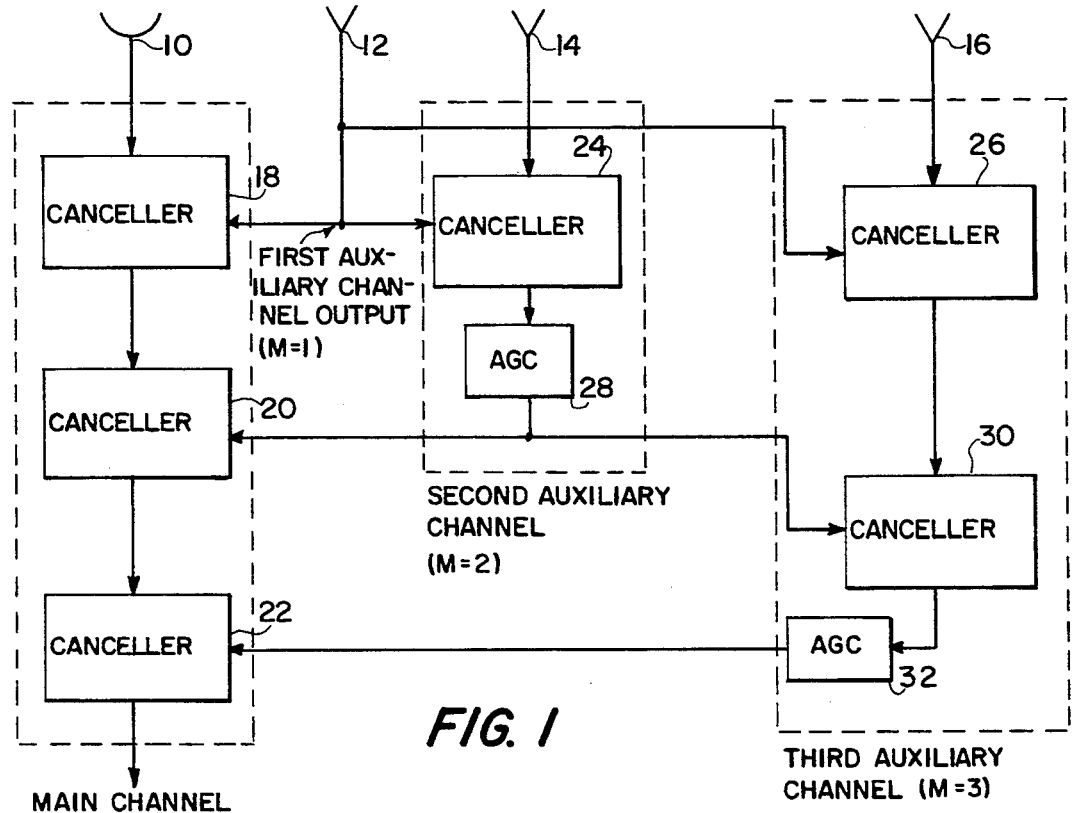
FIG. 1 is a block diagram of a sidelobe canceller system using preprocessing to cancel multiple interference signals.

A sidelobe canceller system using optimum preprocessing of auxiliary signals to cancel multiple interference signals from a main signal is shown in FIG. 1. The system has multiple signal sources including a main antenna 10 and auxiliary antennas 12, 14, 16. Main radar antenna 10 has a main lobe which has a high gain and sidelobes having low gain. The main lobe is normally oriented toward a target and receives, primarily, target reflections while the sidelobes receive interference (e.g., jamming) coming in primarily from other directions. Omnidirectional auxiliary antennas 12, 14, 16 have a gain greater than the gain of the sidelobes of main radar antenna 10, and receive, primarily, interference signals. Main radar antenna 10 and auxiliary antennas 12, 14, 16 include conventional receivers (not shown). The output of main radar antenna 10 is the main radar input and the output of auxiliary antennas 12, 14, and 16 are auxiliary inputs. Only three auxiliary inputs have been shown, but it is well known in the art that at least M auxiliary inputs are needed for cancellation of signals from M jamming sources.

The main radar input is fed to a main channel having a series of cancellers 18, 20, 22. Each canceller may be a conventional adaptive closed-loop canceller as described in U.S. Pat. No. 3,202,990 to Howell, or a conventional digital embodiment of such a loop (U.S. Pat. No. 3,938,153)-or a digital open-loop canceller as describe in "Digital Open-Loop Sidelobe Canceller Techniques", Frank F. Kretschmer, Jr. and Bernard L. Lewis NRL Report 8100, Apr. 6, 1977 (also the subject matter of application Ser. No. 818,180 filed Jul. 22, 1977 now issued as U.S. Pat. No. 4,086,592 on Apr. 25, 1978).

Each canceller has a main terminal (shown entering the top of each canceller) an auxiliary terminal (shown entering the side of each canceller), and an output terminal (shown leaving the bottom of each canceller). The canceller will cancel correlated components between the signals at the main terminal and the auxiliary terminal and leave a residual signal at the output terminal which has all uncorrelated components.

The output of antenna 10 is fed to the main terminal of canceller 18. The output terminal of canceller 18 is connected to the main terminal of canceller 20 which is similarly connected to canceller 22.

The outputs of auxiliary antennas 12, 14, 16 are connected to a preprocessing configuration of cancellers in which M auxiliary channels each have M−1 cancellers. Specifically shown are first, second and third auxiliary channels. In the preprocessing configuration, auxiliary antenna 12 is connected to the auxiliary terminal of main channel canceller 18. In addition the output of auxiliary antenna 12 is connected to the auxiliary terminals of cancellers 24, 26 in the second and third auxiliary channels. Cancellers 24, 26 have their main terminals connected to auxiliary antennas 14, 16, respectively. The output of canceller 24 is connected through AGC 28 to the auxiliary terminal of main-channel canceller 20 and to the auxiliary terminal of canceller 30 in the third auxiliary channel. The output of canceller 26 is connected to the main terminal of canceller 30 in the third auxiliary channel. The output of canceller 30 is connected through AGC 32 to the auxiliary terminal of main channel canceller 22. If the sidelobe canceller system is expanded to four auxiliary antennas (or more) the preprocessing configuration is easily extended also. The fourth auxiliary channel would include three series-connected cancellers which would each receive at its auxiliary terminal the output of one of the previous three auxiliary channels. This could be extended to any number of auxiliary channels.

The use of AGC circuits 28, 32 is optional. If the preprocessing cancellers are adaptive closed loops, they may be used without the AGC circuits but performance is improved with the AGC circuits. If the preprocessing cancellers are digital open-loop cancellers, the AGC circuits are unnecessary.

In operation, main radar antenna 10 of the sidelobe canceller system of FIG. 1 receives radar returns which contain vector components of desired and undesired information. The desired vector components are echos from a target whereas the undesired vector components are interference or jamming signals. Auxiliary antennas 12, 14, 16 receive primarily interference signals which may have vector components which are correlated with the undesirable interference vector components of the main radar input. The auxiliary inputs from auxiliary antenna 12, 14, 16 will be used to cancel the correlated interference components from the main radar input.

To accomplish this, the main radar input from main radar antenna 10 is fed to the main terminal of main channel canceller 18. The output of the first auxiliary channel from auxiliary antenna 12 is fed to the auxiliary terminal of main channel canceller 18. All components of the main channel signal that are correlated with the first auxiliary channel signal are cancelled and the output is the main channel signal having correlated components removed. This is called the residual signal.

The same vector components of the first auxiliary channel which are correlated with the main-channel signal may also exist in the second and third auxiliary channels. It is therefore necessary to use the first auxiliary signal to remove these same correlated components from the second and third auxiliary channels so they are not reintroduced into the main channel in later processing in main-channel cancellers 20,22.

To accomplish this, the first auxiliary-channel input from auxiliary antenna 12 is also fed to the auxiliary terminals of cancellers 24, 26 for the second and third auxiliary channels. Cancellers 24, 26 receive the second and third auxiliary channel inputs at their main terminals from auxiliary antennas 14, 16, respectively. In cancellers 24, 26, all correlated components between the first auxiliary channel and the second and third auxiliary channels are cancelled. This prevents these correlated components from being reintroduced into the main channel again by the second and third auxiliary channels.

After removal of correlated components from the main channel by the first auxiliary channel, the second auxiliary-channel output from canceller 24 is fed through AGC 28 to main-channel canceller 20 where correlated components between the main-channel and second auxiliary-channel signals are cancelled. This leaves a main-channel signal having the correlated components of both the first and second auxiliary channels cancelled.

As with the case of cancelling the correlated components between the first auxiliary channel and main-channel from the third auxiliary-channel signal, the correlated components between the second auxiliary channel and main-channel must be cancelled from the third auxiliary channel. This is done by using the second auxiliary-channel output from canceller 24 (through AGC 28) as the input to the auxiliary terminal of canceller 30 which receives the third auxiliary channel signal at its main terminal. The correlated components are cancelled and the output is fed through AGC 32 to main-channel canceller 22 where the correlated components between the third auxiliary channel and the main-channel are cancelled. The residual output is the main-channel signal with all correlated components from the first, second, and third auxiliary channels removed. This means that all interference from three interference sources has been removed from the main-channel signal.

The described preprocessing arrangement of cancellers is optimum since it uses the fewest possible cancellers and achieves the best possible cancellation of interference. The AGC circuits improve the performance of the circuit by providing a high gain for the auxiliary output of each channel. This improves cancellation in the main-channel cancellers.

Figure 2:
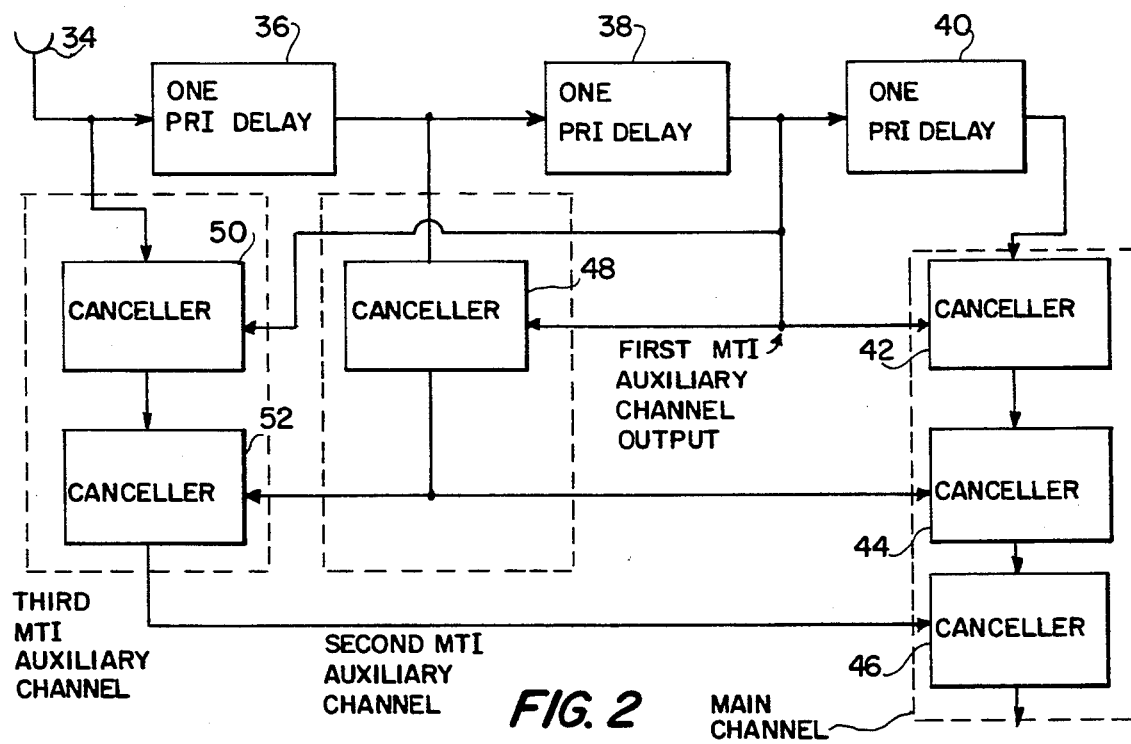
FIG. 2 is a block diagram of a moving-target-indicator system utilizing preprocessing to cancel stationary clutter and indicate moving targets.

FIG. 2 shows the use of a preprocessing arrangement of cancellers in an MTI system using N pulses. In an N-pulse system, N-1 sources of clutter having different velocities (i.e., sea clutter, slow-moving rain squalls, chaff) may be cancelled. As an example, a four-pulse system is shown. An antenna 34 (including receiver) receives successive target-return pulses. Antenna 34 is connected to a serial arrangement of three one-PRI delay circuits 36, 38, 40. The output of one PRI (pulse repetition interval) delay 40 is connected to the main input of the first canceller of a series of cancellers 42, 44, 46 making up a main cancellation channel. The output terminal of canceller 42 is connected to the main terminal of canceller 44, and canceller 46 is connected to the output terminal of canceller 44, with its output terminal providing the MTI output for the system.

The output of antenna 34 is also provided to a preprocessing arrangement of cancellers having M MTI auxiliary channels. This is similar to the preprocessing arrangements of FIG. 1. The first MTI auxiliary channel (M = 1) has no canceller and is the direct output of one of the one-PRF delays, preferably, the second one-PRF delay 38. The remaining MTI auxiliary channels (M > 1) each has M − 1 serial cancellers. The second MTI auxiliary channel has one canceller 48 and the third MTI auxiliary channel has two serial cancellers 50, 52. The number of MTI auxiliary channels could be expanded in the same way as described for the preprocessing arrangement of FIG. 1.

Canceller 50 receives the output of one-PRI delay circuit 38, at its auxiliary terminal and the output of antenna 34 at its main terminal. The output terminal is connected in series to the main terminal of canceller 52 which has its output terminal connected to the auxiliary terminal of main-channel canceller 46. Canceller 48 receives the output of one-PRI delay 36 at its main terminal and the output of one-PRI delay 38 at its auxiliary terminal. The output terminal is connected to the auxiliary inputs of cancellers 44, 52.

Looking at the operation of the MTI system shown in FIG. 2, each radar pulse received will have vector components from a target which will have a phase change from pulse to pulse and hence will be uncorrelated. In addition, the pulses will have components from stationary clutter which do not have a phase change from pulse to pulse and hence are correlated. The MTI system removes the components that are correlated (i.e., stationary clutter) and passes components that are uncorrelated (i.e., moving target).

In the MTI system, antenna 34 receives pulses at a known PRI. The first pulse is fed through all three one-PRI delays 36, 38, 40, which delays the pulse three PRI periods. This pulse is the output of one-PRI delay 40. Following behind the first pulse is a second pulse which is delayed two PRI periods and is the output of one-PRI delay 38 and a third pulse which is delayed one PRI period and is the output of one-PRI delay 36. A fourth pulse is the output of antenna 34. These pulses are all concurrent outputs at the time the fourth pulse is received.

The first pulse is fed from one-PRI delay 40 to the main terminal of canceller 42. The second pulse from the output of one-PRI delay 38, the first MTI auxiliary-channel output, is fed to the auxiliary terminal of canceller 42. All components of the first pulse that are correlated with the second pulse are cancelled and the output is a residual signal having uncorrelated components.

The same components of the first pulse which are correlated with the second pulse may also exist in the third and fourth pulses. It is therefore necessary to use the second pulse to remove these same correlated components from the third and fourth pulses in the second and third MTI auxiliary channels so that they will not be reintroduced into the first pulse in later processing in main channel cancellers 44, 46.

To accomplish this, the second pulse is also fed to the auxiliary terminals of cancellers 48, 50. These cancellers receive the third and fourth pulses respectively at their main terminals. All correlated components between the second pulse and the third and fourth pulses are cancelled. This prevents these components from being reintroduced into the main channel again.

After removal of the correlated components between the first pulse and second pulse in main-channel canceller 42, the output of canceller 48 is fed to the auxiliary terminal of canceller 44 where correlated components between the first and third pulses are cancelled. This leaves the first pulse with correlated components from both the second and third pulses cancelled.

As with the case of cancelling the correlated components between the first and second pulses from the third and fourth pulses, the correlated components between the first and third pulses must be cancelled from the fourth pulse. This is done by using the third pulse, after processing by canceller 48, as the input to the auxiliary terminal of canceller 52 which receives the fourth pulse at its main terminal. The correlated components between the third and fourth pulse are cancelled and the output is fed to main channel canceller 46 where the correlated components between the fourth and the first pulses are cancelled. The residual output is the first pulse with all correlated components with the second, third, and fourth pulses removed. This means that all clutter from three clutter sources has been removed from the first pulse.

The advantages of using adaptive cancellers in an MTI system is that the adaptive cancellers automatically develops weights which place the MTI cancellation notches at the velocities of the various clutter sources. The use of the preprocessing arrangement of cancellers achieves the optimum cancellation of clutter with the minimum number of cancellers for cancellation systems having three or more auxiliary channels.

Prior to this invention it was recognized that a canceller configuration must use auxiliary signals decorrelated from each other to obtain optimum cancellation. However, a technique for optimally decorrelating each auxiliary signal from each other auxiliary signal (for three or more auxiliary channels) was not known and its design was not obvious as is evidenced by different design attempts over several years. In prior attempts designers always analyzed the problem by viewing it from the perspective of decorrelating the signals coming from the antennas. The present inventor shifted his emphasis and viewed the problem from the perspective of having the auxiliary input to each of the serial cancellers in a chain decorrelated from each other input. This resulted in development of the optimum canceller system of the invention.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A canceller system that decorrelates signals by removing correlated components comprising:

multiple signal source means for providing multiple input signals;

a main channel having multiple serially connected cancellers each having a main terminal, an auxiliary terminal and an output terminal, the first of said serially connected cancellers receiving one of said input signals at its main terminal and the remainder of said cancellers each receiving at its main terminal the output from the output terminal of the preceeding canceller; and M auxiliary channels including: a) the first of said auxiliary channels (M=1) being one of said input signals and providing a first auxiliary channel output to one of said cancellers of said main channel; b) the remaining auxiliary channels (M>1) each having, respectively, M−1 serially connected canceller means each said canceller means having a main terminal, an auxiliary terminal and an output terminal, the first serially connected canceller of each auxiliary channel receiving at its main terminal one of said input signals and the remainder of the serially connected cancellers receiving the output from the preceeding canceller at its main terminal, the last serial canceller for each auxiliary channel providing the auxiliary channel output, each canceller of an auxiliary channel receiving at its auxiliary terminal the auxiliary channel output from a different one of the preceeding auxiliary channels, the auxiliary channel outputs also each being provided to the auxiliary terminal of a different one of the main channel cancellers.

2. The canceller system of claim 1 in which said cancellers are digital open-loop cancellers.

3. The canceller system of claim 1 in which said cancellers are adaptive closed-loop cancellers.

4. The canceller system of claim 3 which includes an AGC circuit connected between each auxiliary channel output for M>1 and the respective main-channel canceller receiving the auxiliary channel output.

5. The system of claim 1 being a sidelobe canceller system in which said multiple signal source means includes a main radar antenna for producing a main radar input signal and M auxiliary antennas for producing M auxiliary signal inputs, the main radar input signal being applied to the main terminal of the first serial canceller of said main channel, one of said M auxiliary signal inputs being the first auxiliary channel output, the remaining of said M auxiliary signal inputs each being fed to the main terminal of a different one of the first serial cancellers of each said auxiliary channels.

6. The system of claim 1 being an MTI system in which said multiple signal source means and includes an antenna means for receiving successive radar pulses, multiple one PRI delay means each delaying its input by one pulse repetition interval, the last PRI delay means of said series having an output delayed by M PRI delay periods, the preceeding one PRI delay having an output pulse delayed by M−1 PRI periods and each preceeding one PRI delay means having an output pulse delayed by one less PRI delay period, the last pulse in succession being directly from said antenna means the outputs of the PRI delay means and of said antenna means each being one of said multiple signal source means.

* * * * *